United States Patent [19]

Pace

[11] Patent Number: 5,008,578
[45] Date of Patent: Apr. 16, 1991

[54] PERMANENT MAGNET MOTOR HAVING DIVERTING MAGNETS

[76] Inventor: Sang H. L. Pace, 3802 Green Shadow, Pasadena, Tex. 77503

[21] Appl. No.: 343,923

[22] Filed: Apr. 26, 1989

[51] Int. Cl.⁵ .................. H02K 1/12; H02K 1/17; H02K 21/26
[52] U.S. Cl. .................. 310/256; 310/154; 310/254
[58] Field of Search ............ 310/154, 155, 156, 181, 310/186, 254, 261, 256

[56] References Cited

U.S. PATENT DOCUMENTS

| | | |
|---|---|---|
| 1,648,564 | 11/1927 | Pattay et al. . |
| 3,168,686 | 2/1965 | King et al. ................. 335/306 |
| 3,317,872 | 5/1967 | Wullkopf ................... 335/284 |
| 3,334,254 | 8/1967 | Kober ....................... 310/156 |
| 3,426,224 | 2/1969 | Esters ....................... 310/154 |
| 3,828,213 | 8/1974 | Yamashita et al. . |
| 3,906,268 | 9/1975 | de Graffenried ........... 310/154 |
| 3,939,371 | 2/1976 | Murakami . |
| 4,243,903 | 1/1981 | Mishima . |
| 4,308,479 | 12/1981 | Richter . |
| 4,322,646 | 3/1982 | Persson . |
| 4,376,903 | 3/1983 | Mishima . |
| 4,459,500 | 1/1984 | Miyamoto . |
| 4,481,437 | 11/1984 | Parker . |
| 4,516,046 | 5/1985 | Mercier . |
| 4,645,961 | 2/1987 | Malsky ..................... 310/156 |

FOREIGN PATENT DOCUMENTS

| | | |
|---|---|---|
| 417355 | 2/1950 | Italy . |
| 0049406 | 4/1977 | Japan . |
| 0029235 | 3/1980 | Japan . |
| 0608239 | 5/1978 | U.S.S.R. ................... 310/156 |
| 611272 | 6/1978 | U.S.S.R. . |
| 0633118 | 11/1978 | U.S.S.R. ................... 310/156 |

Primary Examiner—Steven L. Stephan
Assistant Examiner—C. LaBalle
Attorney, Agent, or Firm—Foley & Lardner

[57] ABSTRACT

A dc electric motor having a rotor and a stator and at least a pair of oppositely disposed main magnets associated with one of the rotor and stator and including an end diverting magnet positioned at each end of each main magnet. The diverting magnets have a magnetic field perpendicular to the magnetic field of the main magnets and are oriented to increase the flux density of the main magnets with low magnetic leakage. Preferably, the main and diverting magnets are arcuate shaped segments of approximately 120°. In addition, an interpolar diverting magnet may be positioned on both sides of each main magnet.

3 Claims, 5 Drawing Sheets

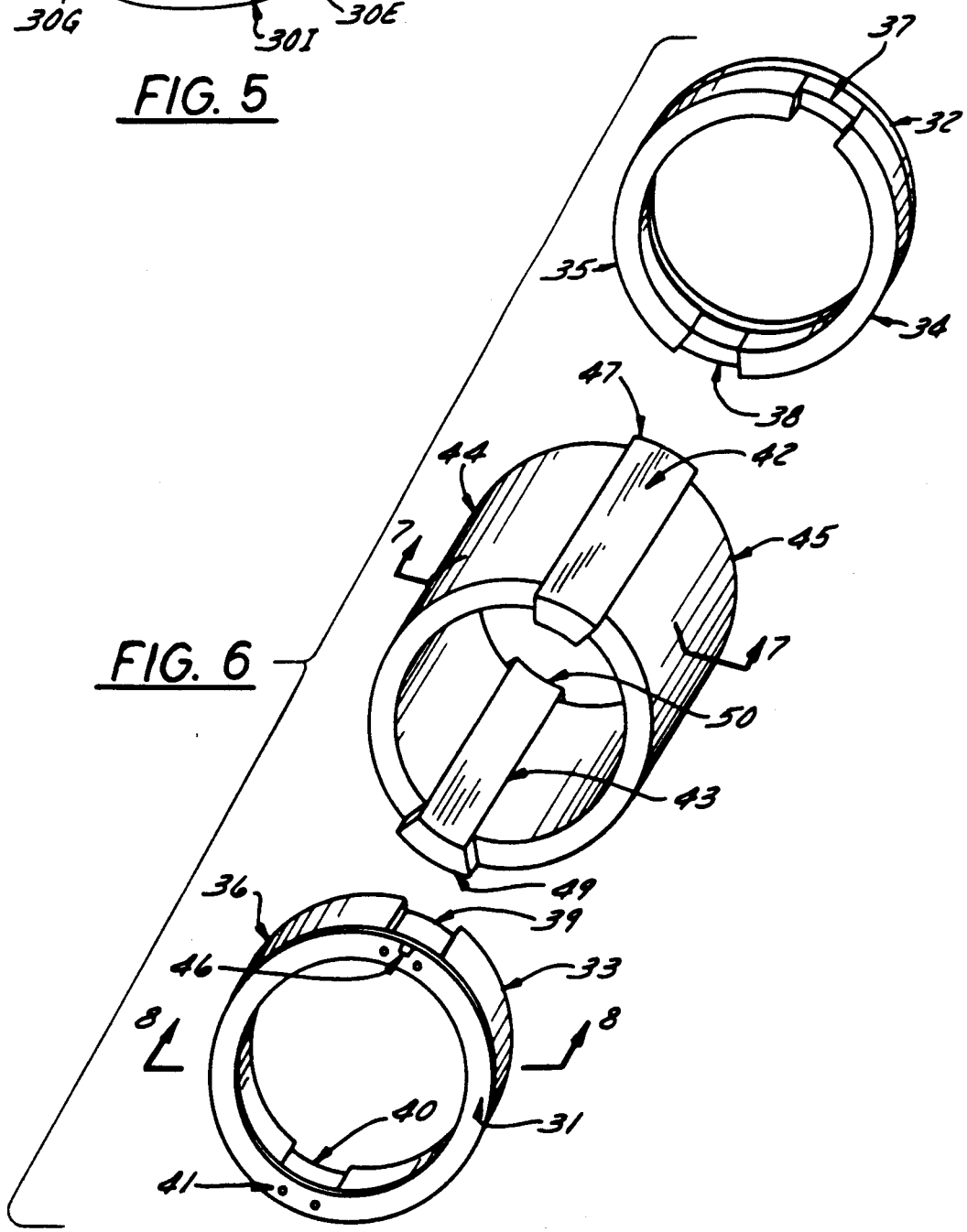

PERMANENT MAGNET MOTOR HAVING DIVERTING MAGNETS

BACKGROUND OF THE INVENTION

This invention relates to permanent magnet dc electric motor having a rotor and a stator and at least a pair of oppositely disposed main magnets. In particular, the present invention provides diverting magnets for use with the main magnets which provides a magnetic field having a very high flux density, which means high reluctance with little magnetic leakage. In particular, the present invention relates to a permanent magnet stator for a dc motor having diverting magnets which provide high reluctance at the inner periphery of the stator magnets, but which have little magnetic leakage between the interpolar space and also low magnetic leakage at the outer periphery of the stator magnets.

The present invention is based upon the free pole theory. In a permanent magnet, atoms consist of very small atomic nuclei surrounded by clouds of electrons. In some kind of atoms, there are more electrons circulating in a clockwise direction around its own axis than in a counterclockwise direction. There is then resultant rotational motions of electrons around the nucleus. Such motion of electrons constitutes a current and develops a magnetic field just as current in a coil produce a magnetic field. They are little permanent magnets with external fields just like the field of dipole. It is a well known, observed phenomenon that when two like poles of permanent magnets are facing each other, strong repulsion occurs therebetween. The flux density in the middle of two like poles seems greater than original flux density. Because of opposing magnetic fields, negative divergence occurs near the center of two like magnets. The negative divergence of magnetic pole at a point inside of the body equals the pole strength per unit volume at that point. These diverged poles are called free poles.

In the case of unlike poles which attract each other, all of the free poles are diverged to opposite sides and intensify the flux density at both ends of the magnet.

In order to design a good permanent magnet dc motor, several important design parameters should be considered. The magnetic density at the pole faces should have maximum value, and interpole magnetic leakage and magnetic leakage at the outer periphery of stator magnets should be minimum. For instance, the conventional, two pole permanent magnet dc motor has a large interpole working air gap, the greater reluctance of the long air gap reduces the total flux, and increases the magnetic leakage, and there is more leakage because there is little difference in the reluctance of the useful and the leakage path. Although the magnetic flux can be encouraged to follow a ferromagnetic path and to cross a working air gap, it cannot be confined completely thereto because of ferromagnetic material exhibit a non-linear relation between flux density B and magnetizing force H, because the saturation phenomenon. Prior art designs attempted to increase the useful flux density, and to reduce the magnetic leakage. A permanent magnet stator for reducing the magnet leakage between the main magnets is disclosed in U.S. Pat. No. 4,243,903. As illustrated in FIG. 1, this prior art has two blocking magnets 4 and 5, each producing a magnetic field opposite in direction, but equal in intensity to the magnetic field between the main magnets 1 and 2. At the vicinity of boundary areas 6, 7, 8 and 9 where two opposing poles meet together, a very high intensity magnetic flux is created. This might be good as useful reluctance for the armature, but the areas 6, 7, 8 and 9 will emit strong magnetic field through the yoke 3 as wasted magnetic leakage.

Another previous invention relating to increasing flux density and reducing magnetic leakage is disclosed in U.S. Patent No. 4,459,500, and shown in FIG. 2. A pair of auxiliary magnets 10 and 11 are mounted on the axial end surface of a pole piece 12 to reduce the magnetic flux leakage from the pole piece 12 for increased magnetic force. FIG. 2 shows the positional relationship between the pole piece 12, permanent magnets 13 and 14 and repulsive auxiliary magnets 10 and 11 which are disposed around the pole piece 12. A north seeking pole N appears on the inner surface 15 of the pole piece 12. Because all four magnets are facing each other, all the diverged magnetic poles are diverged toward the pole piece 12, and intensify the magnetic flux at the pole piece 12, and provide a high flux density at pole piece face 15. Despite the high flux density at the pole face 15, it has low reluctance, and a high magnetic leakage at the outer surface 16.

Therefore, it is obvious that the prior art motors increased the flux density at the cost of magnetic leakage, and the magnetic field efficiency per fixed magnet volume.

SUMMARY

The present invention is directed to a dc electric motor having a rotor and a stator and at least a pair of oppositely disposed main magnets associated with one of the rotor and stator. An end diverting magnet is positioned at each end of each main magnet. The diverting magnets have a magnetic field directed perpendicular to the magnetic field of the main magnets and the magnetic orientation of the diverting magnets relative to the main magnets are positioned to increase the flux density of the main magnets with a low magnetic leakage.

Still a further object of the present invention is the provision of an interpolar diverting magnet positioned on both sides of each main magnet in which the interpolar magnets have a magnetic field generally parallel to the magnetic field of the main magnets.

Still a further object of the present invention is the provision of a stator with permanent magnetic stator exitation to provide a field for a permanent magnet dc motor. Preferably, the main magnets are arcuate segments of approximately 120°. The magnet orientation of the end diverting magnets and the interpolar diverting magnets are aligned such that the inner periphery of each stator magnet has homopolarity resulting in a very high flux density and high reluctance and the outer periphery of each stator magnet has heteropolarity resulting in a very low magnetic leakage, low reluctance of the negative and positive divergence of magnetic poles.

A still further object of the present invention is wherein the end diverting magnet extends inwardly from the main magnets a distance approximately equal to the air gap between the rotor and stator plus one-half of the distance between the rotor coil and the rotor outer periphery.

Other and further objects, features and advantages will be apparent from the following description of a presently preferred embodiment of the invention, given

BRIEF DESCRIPTION OF THE DRAWINGS

FIG. 5 is a schematic elevational view illustrating the principle of the present invention, FIG. 6 is an exploded perspective view of the present invention incorporated in the stator of a dc electric motor.

DESCRIPTION OF THE PREFERRED EMBODIMENT

Figure 1:
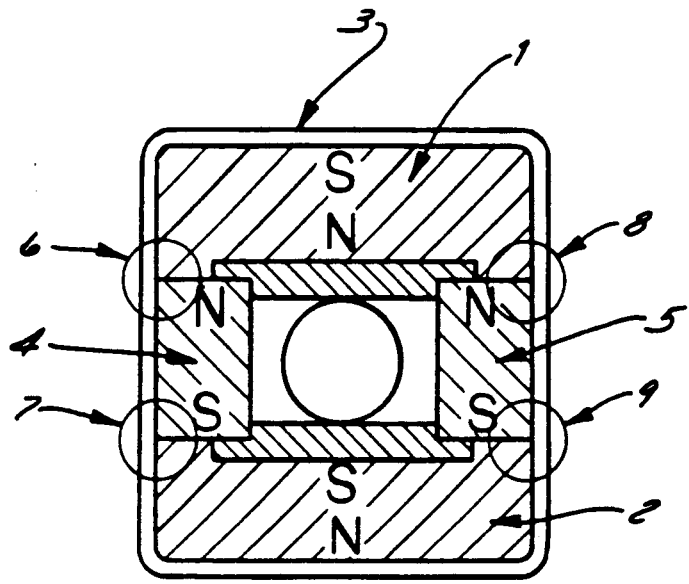
FIG. 1 is an elevational view, in cross section, of one prior art permanent magnet motor with auxiliary magnets.
Figure 2:
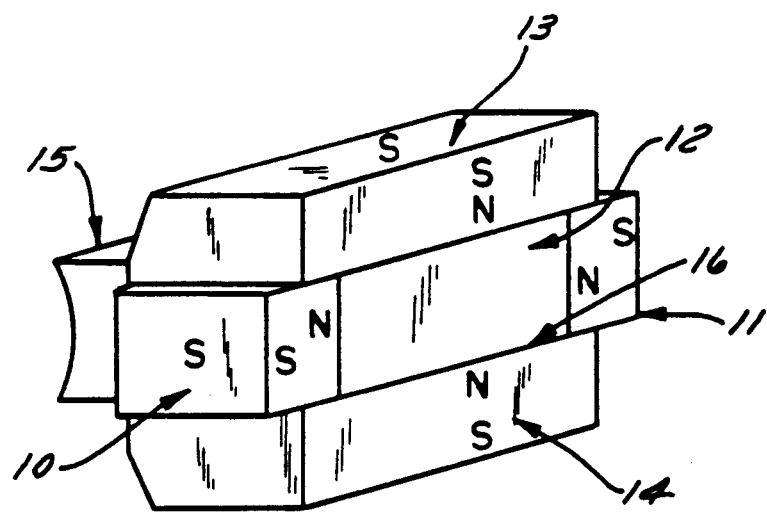
FIG. 2 is a perspective elevational view of one pole piece of a prior art permanent magnet motor.
Figure 3:
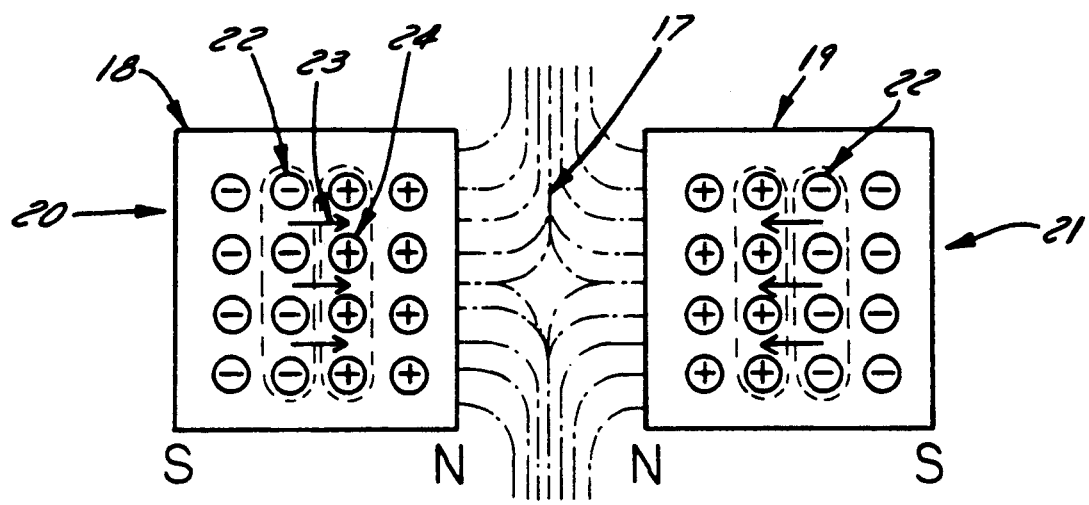
FIG. 3 is a schematic elevational view illustrating the dynamics of free poles between two like magnetic poles.
Figure 4:
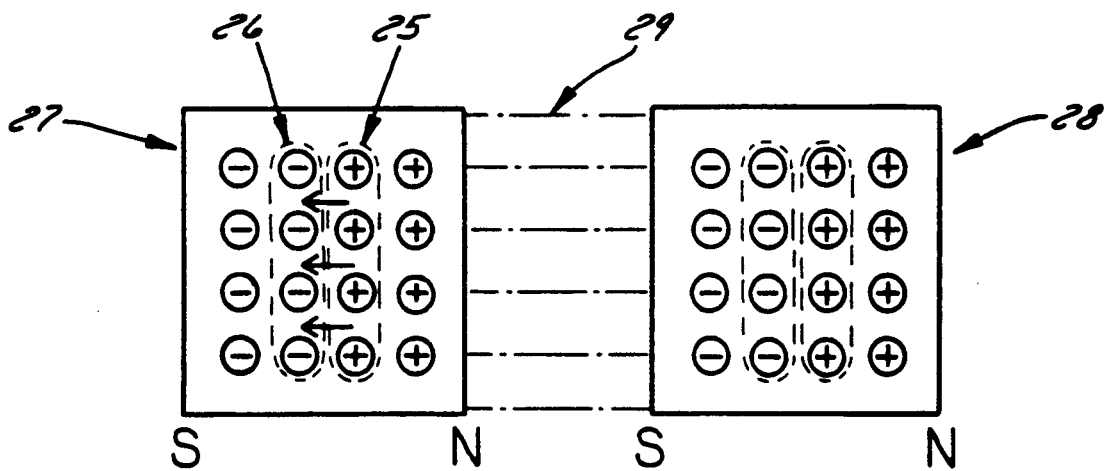
FIG. 4 is a schematic elevational view illustrating the dynamics of the magnetic field between two unlike facing magnetic poles.

Referring now to FIGS. 3, 4 and 5, the basic concepts of the theory of the present invention is best illustrated.

FIG. 3 illustrates the dynamics of free poles inside of permanent magnets when two like magnet poles are facing each other. The flux density is increased at the middle 17 between the two magnets 18 and 19, and the flux density at the outer sides 20 and 21 of magnets 18 and 19 is decreased. Since the negative poles 22 (generally designated) are diverged as the direct arrow 23 indicates toward positive poles 24, the negative divergence of magnetic poles at a point inside of the body equals the volume pole density at that point. These diverged poles are called free poles. Since free electrons constitute the free poles, the direction of a spinning electron on its own axis is changed under the influence of induced magnetic field. FIG. 4 illustrates the dynamics of magnetic field under the influence of an unlike polarity magnetic field. Positive free poles 25 move to negative area 26, become negative 26, and concurrently the flux density at areas 27 and 28 increase. Also the flux density at area 29 decreases which yields low reluctance.

FIG. 5 is an explanatory diagram for the basic layout between a main stator magnet and a pole diverting magnet explaining the principle upon which the invention is based. The pole diverting magnet 30A is magnetized in the direction as arrow 30B indicates. Magnet 30A is positioned in contact with the main stator magnet 30C which is magnetized in the direction indicated by arrow 30D. Thus there is a 90° angle between the field of the pole diverting magnet 30A magnetization axis 30B and field of main stator magnet 30C magnetization axis 30D. Further the magnetic field at the S pole side of main stator magnet 30C is the vectorial sum of a composite magnetic field, which includes the original field at S pole of main stator magnet 30C, the original field at S pole of pole diverting magnet 30A, the sum of negatively diverged field as arrow 30F indicates at the S pole side of pole diverting magnet 30A, the negatively diverged field as arrow 30E indicates at S pole side of main stator magnet 30C, and the positively diverged field moved toward to the S pole side of main stator magnet 30C as arrow 30G indicates owing to its heteropolarity. Thus, the composite field intensifies the flux density at homopolarity side 30H, and reduces the flux density at hetropolarity side 30I.

While the present permanent magnet and diverting magnet structure can be used as either a stator or a rotor, for purposes of illustration only, the present invention will be described in connection with its use in a stator.

Figure 7:
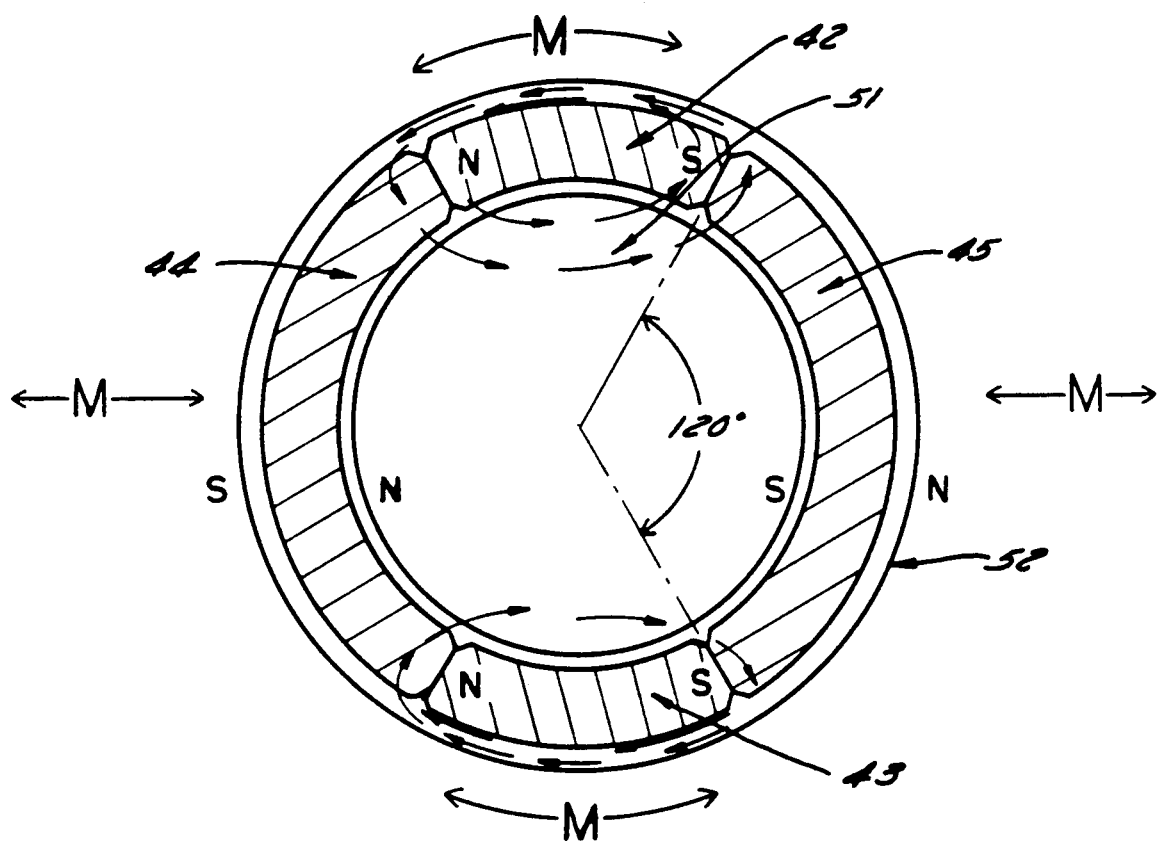
FIG. 7 is a cross-sectional view taken along the line 7—7 of FIG. 6.

Referring now to FIGS. 6 and 7, main stator magnets 44 and 45 are provided oppositely disposed to each other. Preferably, the magnets 44 and 45 are arcuately shaped and are of a subtended angle of approximately 120°. An interpolar diverting magnet is positioned on both sides of each of the main magnets 44 and 45. Thus interpolar diverting magnets 42 and 43 are provided between and in contact with the main magnets 44 and 45 by means of any suitable adhesive such as epoxy. It is to be noted that the magnetic field of the interpolar diverting magnets 42 and 43 are perpendicular to the magnetization axis of the main magnets 44 and 45. As best seen in FIG. 6, the interpolar magnets 42 and 43 have extended portions 47 and 48 and 49 and 50, respectively, as will be more fully discussed hereinafter.

Figure 8:
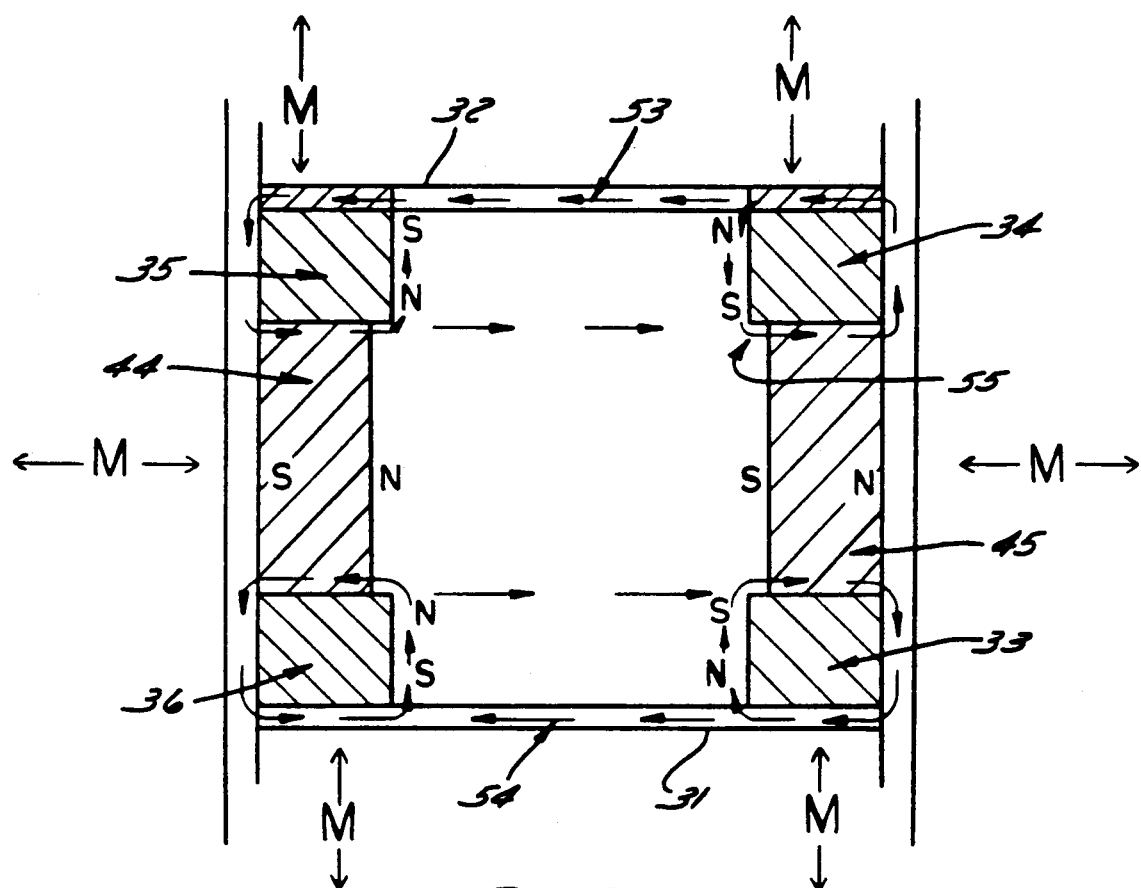
FIG. 8 is a cross-sectional view taken along the line 8—8 of FIG. 6.

Referring now to FIGS. 6 and 8, iron rings 31 and 32 are provided at opposite ends of the stator and provide a magnetic path for end diverting magnets 34, 35 and 33, 36, respectively. End magnets 34 and 35 are attached to ring 32 by any suitable adhesive such as epoxy and are spaced apart with spacers 37 and 38, such as plastic, which provide a recess between the magnets 34 and 35 for receiving the extended ends 47 and 50, respectively, of the interpolar magnets 42 and 43.

Similarly, the magnets 33 and 36 are bonded to the bottom iron ring 31 by a suitable adhesive and are spaced from each other by the addition of a non-magnetic spacer 39 and 40, which provide recesses for receiving the extended ends 48 and 49 of the interpolar magnets 42 and 43, respectively.

The choice of permanent magnet material for all of the permanent magnets depends upon the application. Most suitable materials for this design are strantium ferrite barium ferrite, neodymium-iro-boron magnet, rare earth magnet, or the like that have a high coercive force.

To assemble the stator assembly into a conventional steel housing 52 (FIG. 7), first lower the iron ring 31 assembly into the housing 52. Second, lower the main stator magnet cylinder comprising magnets 42, 43, 44, 45 insuring that the extended portions 48 and 49 of interpolar pole diverting magnets 42 and 43 fit tightly against the spacers 39 and 40 located between end diverting magnets 33 and 36 in order to stop against any angular movement. Then, insert the rotor into the stator and then, lower the iron ring 32 assembly comprising end diverting magnets 34 and 35 and spacers 37 and 38. The extended portions 47 and 50 of interpolar pole diverting magnets 42 and 43 fit into the recesses by the spacers 37 and 38.

Referring again to FIG. 7, the stator permanent magnet segments 44 and 45 provide a magnetic field between them that is generally diametrically across the stator. The interpolar magnets 42 and 43 provide a slightly angular magnetic field, but one which is generally perpendicular to the magnetization axis of the main magnets 44 and 45. The orientation of the poles is as best seen in FIG. 7 which provides that each main magnet 44 and 45 has homopolarity with the adjacent interpolar diverting magnets 42 and 43 at the inner periphery of the main stator magnets 44 and 45. That is, the N pole of magnets 42 and 43 are adjacent N pole of magnet 44, and the S pole of magnets 42 and 43 is positioned adjacent the S pole of magnet 45. This not only provides a high intensifying magnetic flux density but also provides an excellent working gap between the two permanent magnets 44 and 45. Furthermore, the main magnets 44 and 45 receive heteropolarity from the interpolar diverting magnets 42 and 43 at the outer periphery of the stator magnet thus leaving very little magnetic flux at the outer periphery of the interpolar diverting magnets 42 and 43 owing to the negative and positive divergence as explained in connection with FIG. 5 and shows the magnetic path 51 increasing the flux between the permanent magnets 44 and 45.

Referring again to FIG. 8, the main permanent magnets 44 and 45 are disposed in contact with the lower end diverting magnets 33 and 36 and with the upper end diverting magnets 34 and 35 by means of any suitable adhesive. The end diverting magnets 33 and 36 provide a magnetic path 54 through the iron ring 31 as shown. Similarly, the end diverting magnets 34 and 35 provide a magnetic path 53 through the iron ring 32 as shown. Further, the main permanent magnet 44 receives a homopolarity magnetic field from adjacent end diverting magnets 35 and 36 and permanent magnet 45 receives a homopolarity field from adjacent end magnets 33 and 34, all of which intensifies the magnetic flux density at the inner periphery of the main stator magnets 44 and 45. However, the main magnets 44 and 45 have heteropolarity at their outer periphery which reduces the magnetic leakage owing to the negative and positive divergence as explained in connection with FIG. 5. That is, the N poles of magnets 35 and 36 are positioned adjacent the N pole main magnet 44, and the S poles of magnets 33 and 34 are positioned adjacent the S pole main magnet 45.

Preferably, the axial length of the main stator magnets 44 and 45 is about 3/32 seconds inch longer than the axial length of the armature. This is considerably less than a conventional dc motor in which the permanent magnets axial length may be 50% greater than the length of the armature to increase the useful flux.

Figure 9:
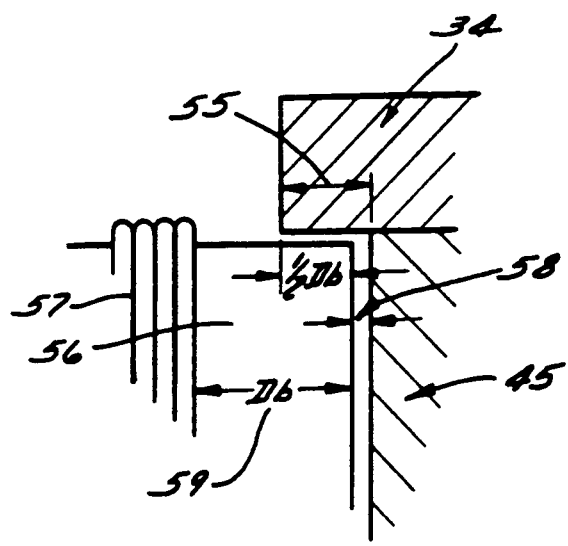
FIG. 9 is an enlarged fragmentary elevational view illustrating the relationship of the stator to a rotor.

Referring now to FIG. 9, the inward extent of the end diverting magnets, such as 34, is best seen. The end magnets are extended inwardly a distance 55 in order to focus the flux to the armature 56. The length of the extension 55 is preferably the sum of the air gap between the rotor 56 and the stator plus half the distance between the rotor periphery and the edge of the rotor coil 57. In FIG. 9, let the extended portion 55 be D, the air gap 58 may be Da and the distance 59 between the rotor end and the edge of the rotor coil 57 may be Db. Therefore the extent of the extension 55 is selected from the formula $$D = Da + \tfrac{1}{2}Db$$

An experimental prototype dc motor built according to the above invention described provides 50%~150%, and a greater output of 1.5~2.5 depending on the size of motor regardless of what kind of material is used for magnet, more pole face flux density than conventional stator magnets and almost 80% less magnetic leakage at the outer periphery of the housing 52 as compared to a conventional motor. Thus, the present invention raises the critical upper limit of the B-H value. Therefore, it is possible to build a motor whose torque is more than 2~6 times stronger than a motor having conventional stator magnets for a motor of substantially the same size. Furthermore, having a high B-H value, means that the torque response is linear with motor current. On the other hand, in order to provide linearity with conventionally designed stator magnets requires expensive electronic controls or complex mechanical gearing.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts will readily suggest themselves to those skilled in the art, and which are encompassed within the spirit of the invention and the scope of the appended claims.

What is claimed is:

1. In a dc electric motor having a rotor and a stator, and at least a pair of oppositely disposed main magnets associated with one of the rotor and stator, the improvement comprising:
    an end diverting magnet positioned at each end of each main magnet, said end diverting magnets having a magnetic field perpendicular to the magnetic field of the main magnets, the magnet orientation of said end diverting magnets being positioned to increase the flux density of the main magnets with low magnetic leakage, wherein the main magnets and said end diverting magnets are arcuate segments of approximately 120°.

2. In a dc electric motor having a rotor and a stator and at least a pair of oppositely disposed main magnets positioned on the interior of the stator, the improvement comprising:
    an end diverting magnet positioned at each end of each main magnet, said end diverting magnets having a magnetic field perpendicular to the magnetic field of the main magnets, the magnetic orientation of said end diverting magnets being positioned to increase the flux density of the main magnets with low magnetic leakage, and wherein the main magnets and said end diverting magnets are arcuate segments of approximately 120°.
    an interpolar diverting magnet positioned on both sides of each main magnet, said interpolar magnets having a magnetic field generally perpendicular to the magnetic orientation of the main magnets.

3. In a dc electric motor having a rotor and a stator and at least a pair of oppositely disposed main magnets positioned on the interior of the stator, the improvement comprising:
    an end diverting magnet positioned at each end of each main magnet, said end diverting magnets having a magnetic field perpendicular to the magnetic field of the main magnets, the magnetic orientation of said end diverting magnets being positioned to increase the flux density of the main magnets with low magnetic leakage, said end diverting magnets extending inwardly from the main magnets a distance approximately equal to the air gap between the rotor and stator plus one-half of the distance between the rotor coil and the rotor outer periphery.

* * * * *